(12) United States Patent
Bhogal et al.

(10) Patent No.: US 11,668,609 B1
(45) Date of Patent: Jun. 6, 2023

(54) SYSTEM AND METHOD FOR TEMPERATURE DETERMINATION

(71) Applicant: June Life, Inc., San Francisco, CA (US)

(72) Inventors: Nikhil Bhogal, San Francisco, CA (US); Nicholas Beyrer, San Francisco, CA (US); Gabriel Risk, San Francisco, CA (US); Mathias Watson Schmidt, San Francisco, CA (US)

(73) Assignee: June Life, Inc., San Francisco, CA (US)

( * ) Notice: Subject to any disclaimer, the term of this patent is extended or adjusted under 35 U.S.C. 154(b) by 0 days.

(21) Appl. No.: 17/889,700

(22) Filed: Aug. 17, 2022

(51) Int. Cl.
*G01K 7/02* (2021.01)
*G01K 3/14* (2006.01)
*G01K 7/16* (2006.01)
*G01K 1/024* (2021.01)
*H01R 13/434* (2006.01)
*H01R 24/58* (2011.01)

(52) U.S. Cl.
CPC ............... *G01K 7/02* (2013.01); *G01K 1/024* (2013.01); *G01K 3/14* (2013.01); *G01K 7/16* (2013.01); *G01K 2207/02* (2013.01); *H01R 13/434* (2013.01); *H01R 24/58* (2013.01)

(58) Field of Classification Search
CPC ............ G01K 7/02; G01K 1/024; G01K 3/14; G01K 7/16; G01K 2207/02; H01R 24/58
See application file for complete search history.

(56) References Cited

U.S. PATENT DOCUMENTS

| | | | | |
|---|---|---|---|---|
| 5,929,350 | A * | 7/1999 | Clauss, Jr. ............. | G01K 7/025 374/E7.006 |
| 6,850,861 | B1 * | 2/2005 | Faiola ..................... | G01K 1/026 374/E1.005 |
| 10,575,385 | B2 * | 2/2020 | Stuby, Jr. ............. | H01R 31/065 |
| 11,022,321 | B1 * | 6/2021 | Bhogal ............... | A47J 37/0664 |
| 2008/0043809 | A1 * | 2/2008 | Herbert ................ | G01K 1/026 374/E1.005 |
| 2014/0269812 | A1 * | 9/2014 | Deutscher ................ | G01K 7/18 374/1 |
| 2014/0341254 | A1 * | 11/2014 | Mendez ................. | G01K 1/026 374/137 |
| 2015/0030053 | A1 * | 1/2015 | Akervall ................ | G01K 7/023 374/179 |
| 2015/0290795 | A1 * | 10/2015 | Oleynik ................. | B25J 9/0081 700/257 |

(Continued)

OTHER PUBLICATIONS

Mehta, Arpit, "Using comparators to detect accessories in portable audio applications", EE Times, May 11, 2008, https://www.eetimes.com/using-comparators-to-detect-accessories-in-portable-audio-applications/.

*Primary Examiner* — Nathaniel T Woodward
*Assistant Examiner* — Philip L Cotey
(74) *Attorney, Agent, or Firm* — Jeffrey Schox; Diana Lin

(57) ABSTRACT

In variants, an automatically-identifiable temperature probe can include: a probe body, one or more sensors, a connector, and/or any other suitable components. In variants, the method for temperature determination can include: determining a set of electrical signals, determining a temperature probe type based on the set of electrical signals, determining a sensor resolution model based on the temperature probe type, and determining a set of final temperature estimates based on the set of electrical signals and the sensor resolution model.

19 Claims, 12 Drawing Sheets

| mappings between ground-signal conductor patterns and temperature probe types ||||||
|---|---|---|---|---|
| temperature probe type | tip | ring 1 | ring 2 | sleeve |
| 1-sensor RTD | grounded | signal | | grounded |
| 2-sensor RTD | grounded | signal | signal | grounded |
| 1-sensor NTC | signal | | | grounded |
| 2-sensor NTC | signal | signal | | grounded |
| 3-sensor NTC | signal | signal | signal | grounded |

(56) References Cited

U.S. PATENT DOCUMENTS

| | | | |
|---|---|---|---|
| 2016/0249127 A1* | 8/2016 | Kim | G10K 11/17881 |
| 2017/0150841 A1* | 6/2017 | Johncock | G05B 15/02 |
| 2017/0167708 A1* | 6/2017 | Kim | H05B 47/19 |
| 2018/0045583 A1* | 2/2018 | Morita | H02P 29/60 |
| 2018/0120167 A1* | 5/2018 | Hammer | G01K 1/026 |
| 2018/0269908 A1* | 9/2018 | Gopisetti | H04B 1/02 |
| 2020/0243921 A1* | 7/2020 | Anderten | G01K 7/16 |
| 2021/0180797 A1* | 6/2021 | Bhogal | A47J 27/04 |
| 2021/0200289 A1* | 7/2021 | De | G06F 1/188 |
| 2021/0254834 A1* | 8/2021 | Bhogal | H01R 31/065 |
| 2022/0187022 A1* | 6/2022 | Hannah | H05B 47/19 |

* cited by examiner

| temperature probe type | tip | ring 1 | ring 2 | sleeve |
|---|---|---|---|---|
| 1-sensor RTD | grounded | signal | | grounded |
| 2-sensor RTD | grounded | signal | signal | grounded |
| 1-sensor NTC | signal | | | grounded |
| 2-sensor NTC | signal | signal | | grounded |
| 3-sensor NTC | signal | signal | signal | grounded | mappings between ground-signal conductor patterns and temperature probe types

FIGURE 7 models

| lookup table for temperature probe type 1 | |
|---|---|
| resistance | temperature |
| R11 | T11 |
| R12 | T12 |
| R13 | T13 |
| ⋮ | ⋮ |
| R1n | T1n |

...

| lookup table for temperature probe type n | |
|---|---|
| resistance | temperature |
| Rn1 | Tn1 |
| Rn2 | Tn2 |
| Rn3 | Tn3 |
| ⋮ | ⋮ |
| Rnn | Tnn |

FIGURE 8

SYSTEM AND METHOD FOR TEMPERATURE DETERMINATION

TECHNICAL FIELD

This invention relates generally to the cooking field, and more specifically to a new and useful temperature determination system and method in the cooking field.

BRIEF DESCRIPTION OF THE FIGURES

FIG. 7 is an illustrative example of mappings between ground-signal conductor patterns and temperature probe types.

FIG. 8 is an illustrative example of a set of models associated with different temperature probe types.

DESCRIPTION OF THE PREFERRED EMBODIMENTS

Figure 1:
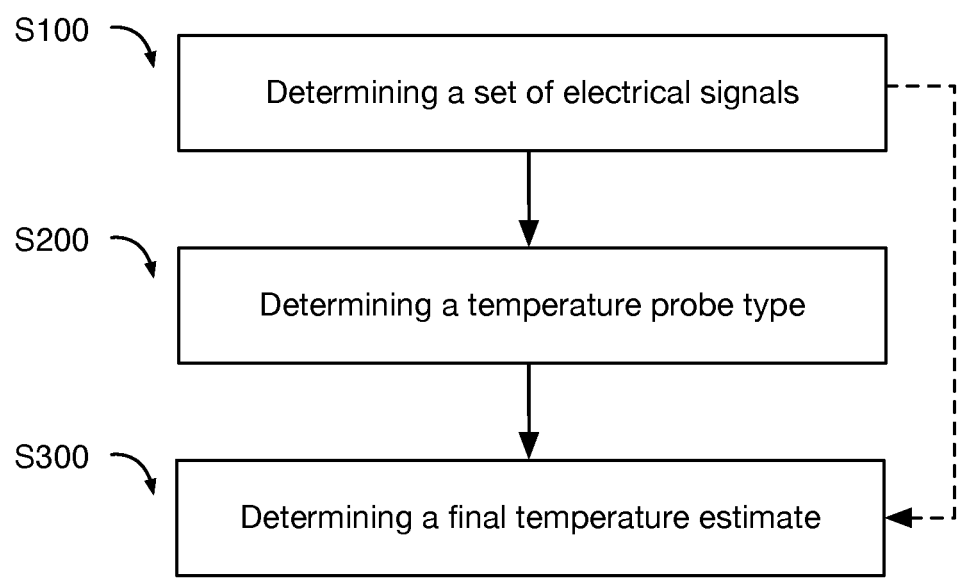
FIG. 1 is a schematic representation of the method.

The following description of the preferred embodiments of the invention is not intended to limit the invention to these preferred embodiments, but rather to enable any person skilled in the art to make and use this invention.

1. OVERVIEW

In variants, the temperature probe 100 can include: a probe body 110, one or more sensors 120, a probe connector 130, and/or any other suitable components. In examples, the connector can include a live/grounded conductor pattern that is specific to the temperature probe type, such that a cooking system 200 can use the connector readouts to both identify the temperature probe type and determine a temperature measurement of a measured substance.

Figure 2:
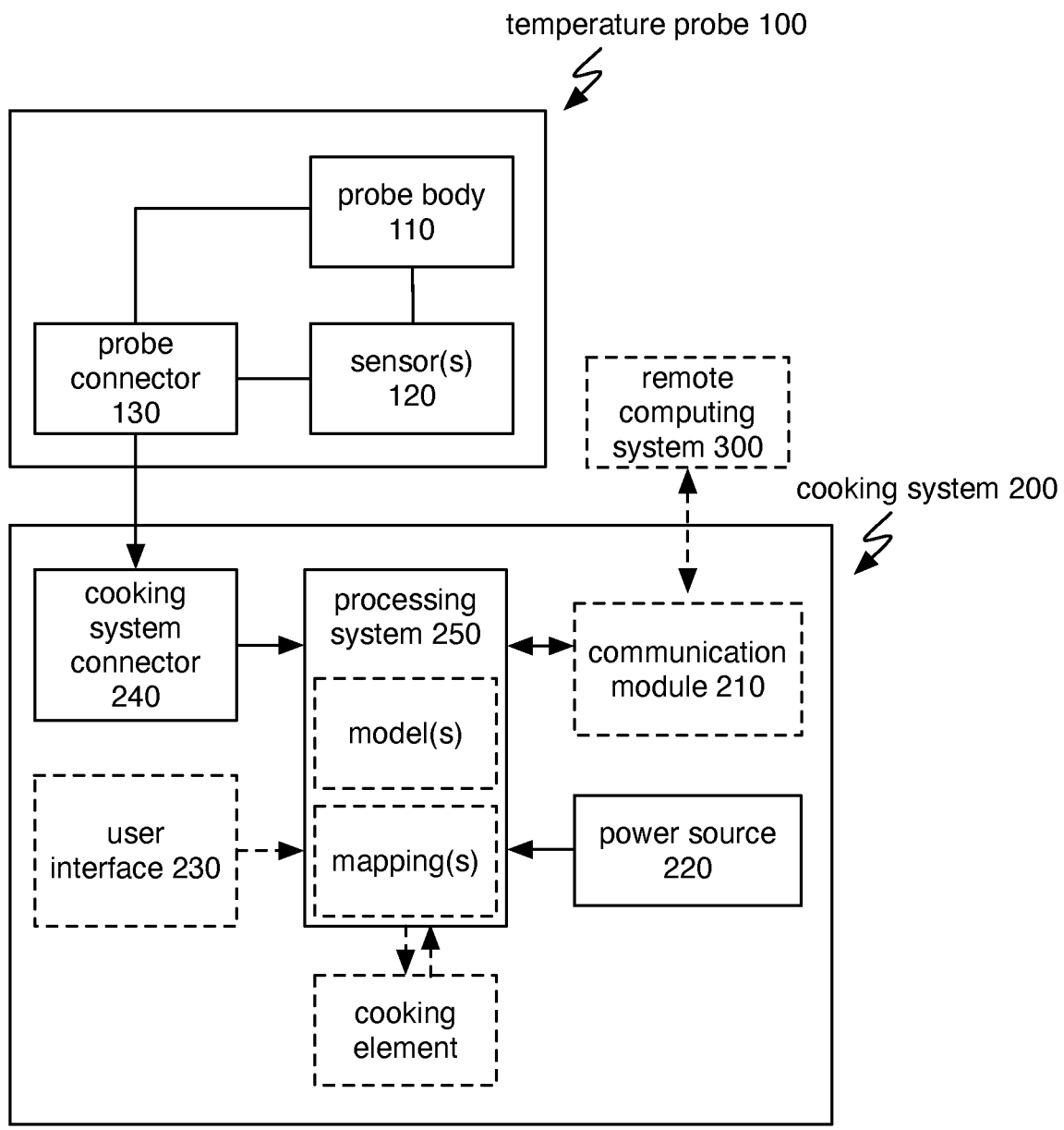
FIG. 2 is a schematic representation of the system.

As shown in FIG. 2, the temperature probe can be used with: one or more cooking systems 200, one or more remote computing systems 300, and/or any other suitable components.

As shown in FIG. 1, the method can include: determining a set of electrical signals S100, determining a temperature probe type S200, determining a final temperature estimate S300, and/or any other suitable elements.

The system and/or method functions to identify the temperature probe 100 connected to a cooking system 200, retrieve the temperature resolution model for the identified temperature probe 100, and/or determine one or more temperature estimates for an object (e.g., based on the temperature resolution model). The object is preferably food (e.g., meat, vegetable, soup, candy, baked goods, etc.), but can additionally and/or alternatively be a human body, an animal body, matter (e.g., air, water, soil, substance, etc.), and/or any other suitable object. The temperature estimate can be: internal object temperature, external object temperature, ambient temperature, and/or any other suitable temperature.

2. BENEFITS

The cooking system can confer several benefits over conventional systems.

Variants of the technology can automatically identify a temperature probe type at a cooking system (e.g., oven, grill, smoker, temperature probe hub, etc.) without user selection. In these variants, the cooking system can receive a set of electrical signals from the temperature probe and determine a temperature probe type, based on which conductor(s) of the temperature probe are associated with the set of sensed electrical signals. In an illustrative example, the technology can use the pattern of grounded and signal conductors to uniquely identify a temperature probe type and/or make and model. In examples, this can be particularly beneficial since the same resistance measured by different temperature probe types and/or manufacture can map to different temperatures. By automatically identifying the temperature probe type and/or manufacture, the technology can enable the cooking system to generate more accurate temperature estimates for the food by selecting the correct temperature model for temperature probe signal interpretation. This can also create a more facile user experience, since the user no longer needs to manually enter the probe type into the cooking system each time the probe is turned on or plugged in.

However, the systems and/or method can confer any suitable set of benefits.

3. SYSTEM

The temperature probe 100 functions to measure one or more temperatures of an object. The system can include one temperature probe 100, multiple temperature probes 100, and/or any other suitable number of temperature probes. The temperature probe wo preferably measures an internal temperature of an object, but can additionally and/or alternatively measure an external temperature of an object. The temperature probe can be configured to be: continuously operable (e.g., from a continuous insertion of the temperature probe 100 into an object), intermittently operable (e.g., from an intermittent insertion of the temperature probe 100 into an object), and/or otherwise configured for use. The temperature probe 100 is preferably removably coupleable to a cooking system 200, but can additionally and/or alternatively be mounted to a cooking system 200, and/or otherwise coupled to a cooking system. The temperature probe 100 is preferably physically plugged into the cooking system 200 (e.g., connected to the cooking system 200 by a wired connection), but can additionally or alternatively be connected by a wireless connection and/or any other suitable connection. The temperature probe 100 can be: automatically actuated, manually actuated, passively actuated, and/or otherwise actuated. The temperature probe 100 can be grounded or ungrounded.

The temperature probe 100 can include: a probe body 110, one or more sensors 120, a probe connector 130, optionally a power source 140, and/or any other suitable components.

The probe body no functions to support the one or more sensors 120. The temperature probe 100 can include one probe body 110, multiple probe bodies 110, and/or any other suitable number of probe bodies. The probe body 110 is preferably rigid, but can alternatively be flexible. The probe body 110 is preferably straight, but can alternatively be curved and/or have any other suitable geometry. The probe body 110 is preferably thermally conductive, but can alternatively be thermally insulative, thermally dissipative, and/or any other suitable thermal properties. The probe body 110 is preferably metal (e.g., aluminum, stainless steel, copper, etc.), but can additionally and/or alternatively be ceramic, polymer (e.g., silicone rubber, plastic, etc.), glass, and/or any other suitable material. The first end of the probe body 110 is preferably statically connected to the probe connector 130 (e.g., via a wire, solder, and/or other physical connection), but can additionally or alternatively be wirelessly connected to the probe connector 130, and/or otherwise coupled to the connector and/or cooking system 200. The probe body 110 and/or second end thereof (e.g., probe tip, opposing end, free end, etc.) preferably supports (e.g., mounts) one or more sensors 120. However, the probe body 110 can be otherwise configured.

The sensors 120 function to determine temperature measurements. The temperature probe 100 can include: one sensor 120, multiple sensors 120, and/or any other suitable number of sensors. The sensors 120 on each temperature probe 100 can be of the same or different sensor type or manufacture. The sensors are preferably analog sensors (e.g., output a resistance, voltage, or current readout), but can additionally or alternatively be a digital sensor (e.g., output a digital stream of measurements). The sensors are preferably temperature sensors, but can alternatively be humidity sensors, particle sensors, light sensors, motion sensors (e.g., IMU, accelerometers, etc.), pressure sensors, and/or a sensor for any other sensing modality. The temperature sensors can be: thermistors, temperature detectors (e.g., resistance temperature detectors), thermocouples, semiconductor-based sensors and/or any other suitable sensor. Examples of temperature sensors that can be used include: resistance temperature detectors (RTDs), negative temperature coefficient thermistors (NTCs), positive temperature coefficient thermistors (PTCs), and/or any other suitable sensors. The temperature probe 100 and/or each sensor 120 thereof can have a measurement accuracy and/or measurement precision within: 0.1° F., 0.2° F., 0.5° F., 1° F., 1.5° F., 2° F., 10° F., more than 10° F., within any range bounded by any of the aforementioned values, and/or any other suitable measurement accuracy and/or measurement precision. The temperature probe 100 and/or each sensor 120 can have a measurement range bounded by any of the following values: −1000° F., −500° F., −200° F., −100° F., −50° F., 0° F., 20° F., 100° F., 300° F., 600° F., 4000° F., and/or any other suitable measurement range. The sensors 120 can have: an exponential response, a linear resistance response, a voltage response, a hysteretic response, and/or any other suitable response. The sensors 120 preferably output varying resistance indicative of different measured temperatures, but can additionally or alternatively output: voltage, current, and/or vary any other suitable electromagnetic parameter value as a function of the measured temperature.

Each temperature probe 100 can include one or more sensors 120. In variants, the temperature probe 100 can include multiple sensors 120 to confer resilience to common user errors. Such variants can provide flexibility in user error resulting from improper temperature probe insertion, such as common errors associated with: the probe tip not touching the center of the object (e.g., food), the temperature probe 100 touching the walls of a container (e.g., of a cooking system 200), and/or any other additional challenges/common errors. The multiple sensors 120 can be of the same or different type of sensor. The multiple measurements sampled by the multiple sensors can be: fused into a single measurement (e.g., by taking the mean, median, minimum, maximum, most stable, least deviation, and/or any other measurement, etc.), used to determine a spatial temperature distribution, used to determine a timeseries of temperatures (e.g., historic and/or future temperature measurement values), and/or otherwise used. In an example, determining the lowest measured temperature between the multiple sensors 120 can achieve a more accurate temperature estimation of internal temperature of the object.

Each sensor 120 can be: flush with the probe body 110, recessed from the probe body 110, protrude from the probe body 110, aligned along the probe body 110, inside the probe body 110, and/or otherwise arranged relative to the probe body. In an example, multiple sensors 120 are linearly aligned within the probe body 110 (e.g., along the same side, along the longitudinal axis, etc.). In another example, multiple sensors 120 are located at different positions along the probe body length and arranged in a pattern (e.g., a spiral pattern, a zigzag pattern, etc.). However, multiple sensors 120 can be otherwise arranged. The separation distance between multiple sensors 120 can be: 1 mm, 5 mm, 10 mm, 15 mm, 20 mm, within any range bounded by any of the aforementioned values, and/or any other suitable distance.

Measurements (e.g., temperature measurements) are preferably contemporaneously (e.g., concurrently, within the same timeframe, etc.) sampled by the multiple sensors 120, but can additionally and/or alternatively be asynchronously sampled. In variants, a temperature estimate can be determined (e.g., by a processing system 250 of a cooking system 200, a remote computing system 300) based on the temperature measurements sampled by multiple sensors 120, but can additionally and/or alternatively be based on one sampled temperature measurement by a single sensor 120 (e.g., a timeseries of temperature measurements from the sensor 120), and/or otherwise determined.

However, the sensors 120 can be otherwise configured.

Figure 4:
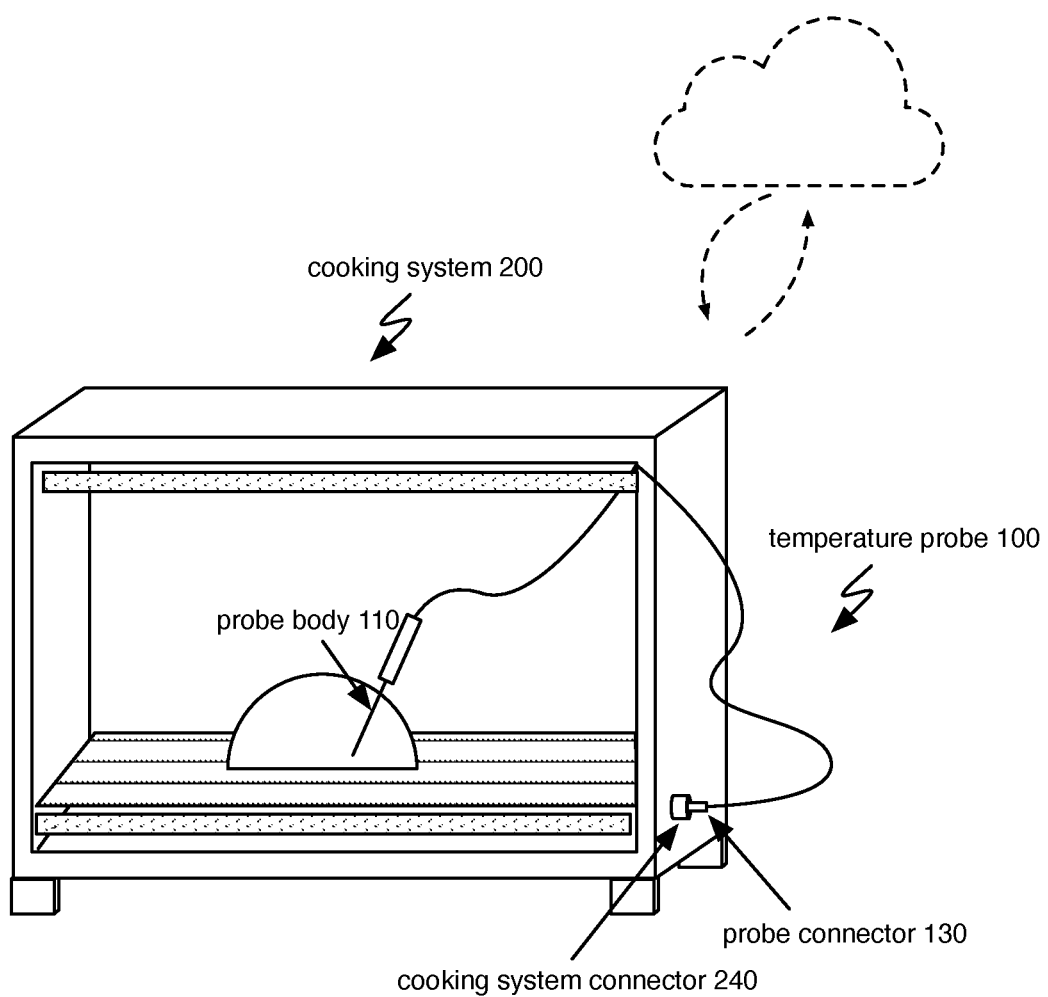
FIG. 4 is an illustrative example of using the temperature probe with a cooking system.
Figure 10:
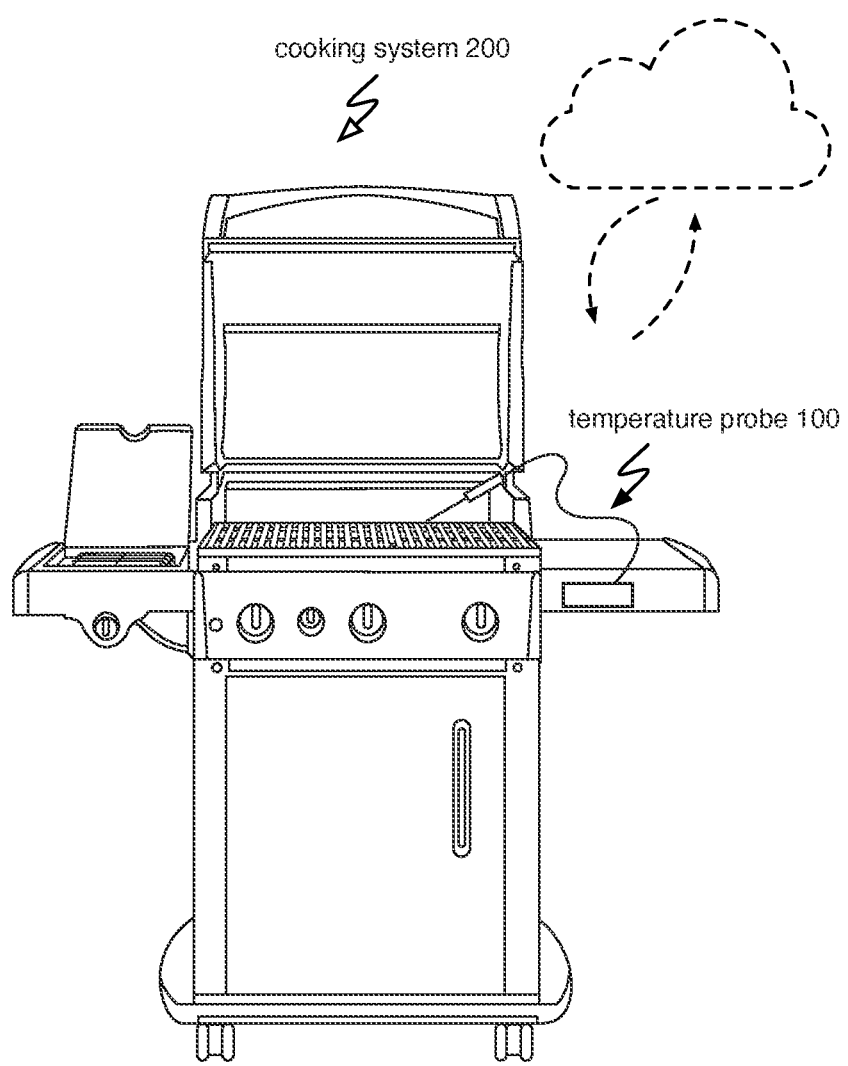
FIG. 10 is an illustrative example of using the temperature probe with a cooking system.
Figure 11:
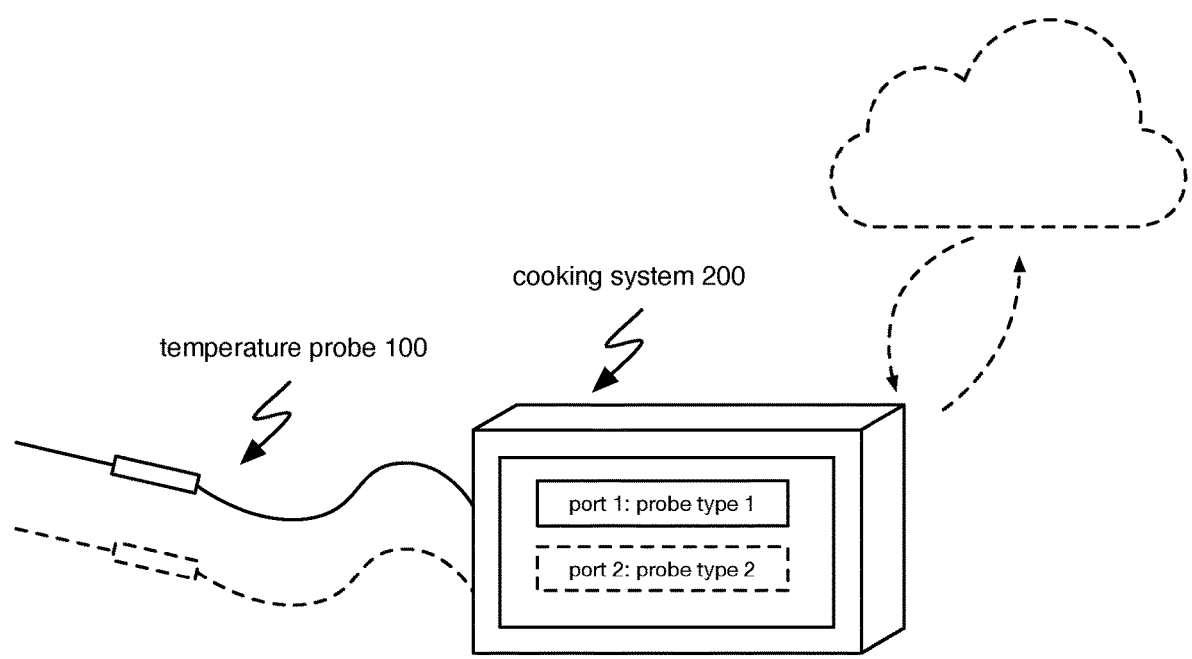
FIG. 11 is an illustrative example of using the temperature probe with a cooking system.

The probe connector 130 functions to connect a cooking system 200 to the temperature probe 100; examples shown in FIG. 4, FIG. 10, and FIG. 11. The probe connector 130 preferably removably connects a cooking system 200 to the temperature probe 100, but can alternatively permanently connect the cooking system 200 to the temperature probe 100, and/or otherwise configured. The probe connector 130 can be: a mechanical connector, a data connector, a power connector, and/or any other suitable connector. The temperature probe 100 can include: one probe connector 130, multiple probe connectors 130 (e.g., 2, 3, etc.), and/or any other suitable number of connectors. The probe connector 130 is preferably electrically conductive, but can alternatively be electrically insulative, thermally dissipative, and/or have any other suitable properties. The probe connector 130 can be: metal (e.g., aluminum, stainless steel, copper, etc.), ceramic, polymer (e.g., silicone rubber, plastic, etc.), glass, and/or any other suitable material. The probe connector 130 is preferably a male connector, but can additionally and/or alternatively be a female connector. The probe connector 130 preferably connects to a female connector, but can additionally and/or alternatively connect to a male connector. The probe connector 130 can be: a plug or socket connector, a crimp on connector, a soldered connector, a binding post, a screw terminal, a ring and spade connector, a blade connector, twist-on wire connector, alligator clip, and/or any other suitable connector. The probe connector 130 is preferably an auxiliary plug, but can additionally and/or alternatively be a USB-A cable, a USB-C cable, a micro-USB cable, a headphone plug, and/or any other suitable connector.

Figure 6A:
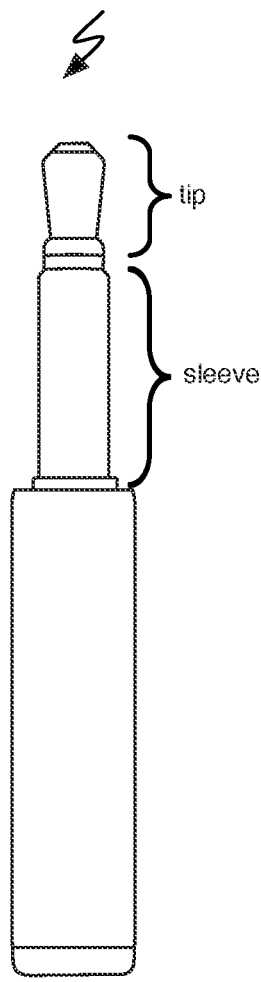
FIGS. 6A-6C are illustrative examples of connectors of the temperature probe.
Figure 6B:
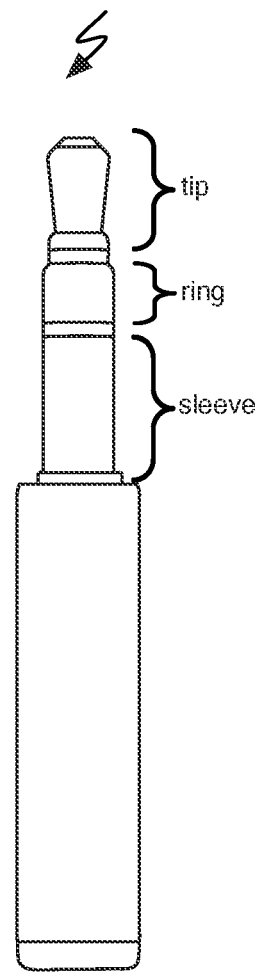
Figure 6C:
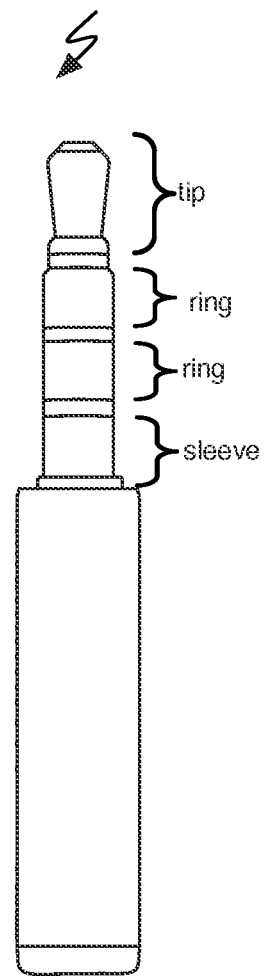

The probe connector 130 preferably includes two or more conductors, but can additionally and/or alternatively include one conductor, and/or any other suitable number of conductors. Each conductor of the probe connector 130 is preferably electrically connected (e.g., wired) to a sensor 120 of the temperature probe 100, but can additionally and/or alternatively be electrically connected to multiple sensors 120 of the temperature probe 100 or no sensors of the temperature probe 100 (e.g., be grounded to a housing or other electrical ground). The signal carried (e.g., transmitted, received, etc.) by each conductor is preferably directly output by the respective sensor, but can additionally or alternatively be otherwise processed. The signal is preferably an analog signal, but can alternatively be a digital signal. Each conductor can be: a tip, a ring, a sleeve, and/or any other suitable component. In a first example, the probe connector 130 includes only a tip, a ring, and a sleeve (e.g., be a TRS connector; example shown in FIG. 6B). In a second example, the probe connector 130 only includes a tip, two rings, and a sleeve (e.g., be a TRRS connector; example shown in FIG. 6C). In a third example, the probe connector 130 only includes a tip, three rings, and a sleeve (e.g., be a TRRRS connector). In a fourth example, the probe connector 130 only includes a tip and a sleeve (e.g., be a TS connector; example shown in FIG. 6A). However, the probe connector 130 can include any other number of rings, tips, and/or sleeves.

In a first variant, the probe connector 130 can be permanently wired to the one or more sensors 120.

In a second variant, the probe connector 130 can be removably coupled to the one or more sensors 120. For example, an adapter is used to convert a third-party temperature probe ground-signal conductor pattern to the system-standard ground-signal conductor pattern. The adapter is preferably specific to the temperature probe type and the third-party temperature probe, but can alternatively be generic. The adapter includes a female adapter connector and a male adapter connector, wherein the male adapter connector is removably coupleable to cooking system connector 240, and the female connector is removably coupleable to the third-party connector. In an example, the female adapter connector can include a set of contacts configured to connect to the conductors of the third-party temperature probe. The set of contacts can include a contact for each third-party temperature probe conductor (e.g., one contact for each tip, ring, and/or sleeve), a single contact for multiple third-party temperature probe conductors (e.g., wherein sequential third-party temperature probe's conductors have the same signal or ground), and/or any other suitable cardinality between the third party temperature probe conductors and the contacts. The adapter can include wiring that connects the conductors of the third-party connector for the third-party probe to the conductors of the cooking system connector 240 for the system-standard temperature probe type, or be otherwise configured. For example, when a third party NTC has a grounded tip and sleeve, with a live ring, the adapter can include a female adapter connector with a tip, ring, and sleeve contacts (e.g., corresponding to the tip, ring, and sleeve positions), the male adapter connector can include a tip conductor connected to the ring contact, one or more rings connected to the tip and/or sleeve contact, and a sleeve connected to electrical ground and/or the tip and/or sleeve contact. However, the adapter can be otherwise configured.

However, the probe connector 130 can be otherwise configured.

The temperature probe 100 is preferably associated with a temperature probe type, but can additionally and/or alternatively be associated with, a temperature probe make and/or model (e.g., PT100 RTD), and/or any other suitable identifier. The temperature probe type can be associated with a number of sensors (e.g., of the sensor(s) 120), a type of sensors (e.g., of the sensor(s) 120), and/or any other suitable probe attribute. In examples, the temperature probe type can be: 1-sensor NTC, 2-sensor NTC, 3-sensor NTC, 1-sensor RTD, 2-sensor RTD, 3-sensor RTD, and/or any other suitable temperature probe type.

Each temperature probe, temperature probe type, or temperature sensor can be associated with a different ground-signal conductor pattern (e.g., different spatial patterns, electrical patterns, live/ground pattern, etc.), but can alternatively have the same ground-signal conductor pattern, permutation, and/or combination. A ground-signal conductor pattern is preferably unique to a temperature probe type or temperature sensor type, but can alternatively be nonunique, and/or otherwise related to the temperature probe. In a first embodiment, the ground-signal conductor pattern can be used to identify the sensor probe type (e.g., temperature probe type), which, in turn, can be used to retrieve the sensor resolution model (e.g., temperature resolution model) used to resolve sensor probe signals into sensor measurements (e.g., temperature measurements) and/or retrieve the fusion model used to fuse measurements from multiple sensors into a single readout. In a second embodiment, the ground-signal conductor pattern can be used to identify the sensor type (e.g., temperature sensor type, such as NTC or RTD), which can be used to retrieve the sensor resolution model for the sensor type (e.g., wherein the sensor resolution model can be applied to a subset or all of the signals output by the temperature probe). For example, NTC sensors can use an exponential resolution model (e.g., relating a resistance response to a temperature value using an exponential model), RTD sensors can use a linear resolution model (e.g., relating a resistance response to a temperature value using a linear model), and thermocouples can use a thermocouple-specific resolution model (e.g., relating a voltage response to a temperature value). In this embodiment, variants of the system only need to store sensor resolution models for each sensor type (e.g., does not include models for each temperature probe type or sensor combination); alternatively, the system can include sensor resolution models for: each temperature probe type, each temperature probe type and each sensor type, and/or any other suitable set of sensor resolution models. However, the ground-signal pattern can be otherwise used. The ground-signal conductor pattern is preferably defined by whether each conductor (e.g., a tip, a ring, a sleeve, etc.) of the probe connector 130 is associated with (e.g., conducts) an electrical signal or is grounded, but can additionally and/or alternatively include any other suitable information.

In a first example, a ground-signal-ground TRS pattern can identify a 1-sensor RTD. In a second example, a ground-signal-signal-ground TRRS pattern can identify a 2-sensor RTD. In a third example, a grounded tip can identify an RTD temperature sensor. In a fourth example, a signal-ground TS pattern can identify a 1-sensor NTC. In a fifth example, a signal-signal-ground TS pattern can identify a 2-sensor NTC. In a sixth example, a signal-signal-signal-ground TS pattern can identify a 3-sensor NTC. In a seventh example, a signal detected at the tip can identify an NTC sensor. Alternatively, a grounded tip can identify a thermistor, NTC, or other temperature sensor or probe; and/or a signaled tip can identify a RTD, thermistor, or other temperature sensor or probe. However, any other suitable ground-signal pattern can identify any other suitable temperature probe type or sensor type.

The temperature probe 100 and/or sensors thereof can optionally include a power source 140 (e.g., be powered or unpowered; active or passive). The temperature probe 100 can be powered by: the power source 140 (e.g., located onboard the temperature probe 100), a cooking system 200 (e.g., via probe connector 130 and cooking system connector 240), and/or otherwise powered. The power source 140 is preferably a rechargeable battery, but can alternatively be a non-rechargeable battery (e.g., a disposal battery), induction coil, RF charger, and/or any other suitable power source. The power source 140 can be: a lithium-ion battery, a nickel-cadmium battery, a nickel-metal-hydride battery, a lithium-ion polymer battery, and/or any other suitable rechargeable battery. The power source 140 is preferably charged via a connector (e.g., same or different as probe connector 130), but can alternatively be charged via Bluetooth, induction, and/or any other suitable power charging component.

However, the power source 140 can be otherwise configured.

However, the temperature probe 100 can be otherwise configured.

The temperature probe can optionally be used with: one or more cooking systems 200, optionally one or more remote computing systems 300, and/or any other suitable components.

The cooking system 200 functions to removably couple the temperature probe 100, enable temperature determination using the temperature probe 100, and/or have any other suitable functionality.

The cooking system 200 is preferably a cooking appliance (e.g., an oven, a grill, a smoker, a sous-vide pot, a refrigerator, examples shown in FIG. 4 and FIG. 10, etc.), but can additionally and/or alternatively be a temperature probe hub (e.g., with a user interface and a set of ports or cooking system connectors 240; example shown in FIG. 11 etc.), and/or any other suitable system. The cooking appliance can include: a cooking cavity (e.g., a heated cavity), a cooking surface (e.g., a heated cook surface such as a cooktop), cooking elements operably connected to and/or mounted within the cooking cavity and/or on the cooking surface (e.g., heating elements, convection elements, steaming elements, smoking elements, etc.), optionally sensing elements operably connected to and/or mounted within the cooking cavity and/or on the cooking surface (e.g., cameras, temperature sensors, humidity sensors, weight sensors, etc.), and/or any other suitable component.

The cooking system 200 is preferably a digitally controllable appliance, but can additionally and/or alternatively be a manually controlled appliance. The cooking system 200 can be concurrently, contemporaneously, and/or asynchronously communicatively connected to one or more: wireless networks, different cooking systems 200, temperature probes 100, remote computing systems 300, and/or any other suitable system.

The cooking system 200 can include: a communication module 210, a power source 220, optionally a user interface 230, a cooking system connector 240, a processing system 250, and/or any other suitable components.

The communication module 210 functions to enable communication between the cooking system 200 and a remote computing system 300 (e.g., transmit and/or receive data by the cooking system 200 to and/or from a remote computing system 300). The cooking system 200 can include one communication module 210, multiple communication modules 210 (e.g., same and/or different types), and/or any other suitable number of communication modules. The communication module 210 is preferably a wireless communication module (e.g., wireless module), but can additionally and/or alternatively be a wired communication module. The communication module 210 can be: Wi-Fi (e.g., WiFi module), Bluetooth (e.g., Bluetooth module; wherein the protocol can be Bluetooth classic, BLE, UWB, etc.), cellular, Zigbee, Z-wave, NFC, RF, mesh, radio, micro-USB, USB-A, USB-C, ethernet, and/or any other suitable communication module.

The communication module 210 preferably stores wireless credentials (e.g., network name, password, cryptographic key, WiFi credentials, Bluetooth credentials, etc.), but can alternatively not store wireless credentials (e.g., wherein the processing system 250 or other system can store the wireless credentials). The communication module 210 can connect to a local network and/or a remote computing system 300 using the wireless credentials, but can alternatively otherwise connect to a local network and/or a remote computing system 300. For example, the communication module 210 is a communication system, such as that described in U.S. application Ser. No. 17/126,815 filed 18 Dec. 2020, which is incorporated in its entirety by this reference.

However, the communication module 210 can be otherwise configured.

The power source 220 functions to power the cooking system 200 and/or the temperature probe 100 for operation. The power source 220 is preferably a rechargeable battery, but can alternatively be a non-rechargeable battery (e.g., a disposal battery), induction coil, RF charger, wall-powered device, and/or any other suitable power source. The power source 220 can be: a lithium-ion battery, a nickel-cadmium battery, a nickel-metal-hydride battery, a lithium-ion polymer battery, and/or any other suitable rechargeable battery. The power source 220 is preferably charged via a connector (e.g., same or different as cooking system connector 240), but can alternatively be charged via Bluetooth, induction, and/or any other suitable power charging component.

However, the power source 220 can be otherwise configured.

The user interface 230 functions to enable a user to interact with the cooking system 200. The cooking system 200 can include: one user interface 230, multiple user interfaces 230, and/or any other suitable number of user interfaces. The user interface 230 preferably includes one or more user outputs, but can additionally and/or alternatively include one or more user inputs, and/or any other suitable component.

The user output is preferably a display, but can additionally and/or alternatively be: a projector, a speaker, a printer, a plotter, a headphone, an external system (e.g., wherein the output data is transmitted to the external system via the wireless connection), and/or any other suitable user output. The display functions to display information from the temperature probe 100. The cooking system 200 can include: one display, multiple displays, and/or any other suitable number of displays. The information is preferably a temperature estimate determined by the processing system 250 of the cooking system 200, but can additionally and/or alternatively be a food identifier, a target temperature, a timer, a temperature probe type, a temperature probe identifier, a temperature probe indicator (e.g., that a temperature probe 100 is connected to the cooking system 200), a temperature probe-port association (e.g., which temperature probe and/or which type of temperature probe is connected to each port), a time elapsed, a time remaining, temperature estimates over a period of time (e.g., in a graph form, in a table form, etc.), temperature estimates aggregated over a period of time (e.g., minimum value, maximum value, average value, median value, mode value, etc.), and/or any other suitable information. The display can be a segmented LCD, a segmented LED, a smartwatch display, an OLED, and/or any other suitable display. Alternatively, the cooking system 200 can exclude a display.

The cooking system 200 can include: one user input, multiple user inputs, and/or any other suitable number of user inputs. The user input can be: a touchscreen (e.g., overlaid over the display, located in a different location, etc.), button(s), a keyboard, a mouse, gesture control, a microphone, a camera, and/or any other suitable user input. Additionally or alternatively, the cooking system 200 can lack user inputs (e.g., lack buttons, touchscreens, etc.), lack a mechanism for manual sensor probe type selection, and/or be otherwise limited.

However, the user interface 230 can be otherwise configured.

The cooking system connector 240 functions to connect the cooking system 200 to a temperature probe 100. The cooking system connector 240 preferably removably connects the cooking system 200 to the temperature probe 100, but can alternatively permanently connect the cooking system 200 to the temperature probe 100, and/or be otherwise configured. The cooking system connector 240 can be: a mechanical connector, a signal connector, a data connector, a power connector, and/or any other suitable connector. The cooking system 200 can include: one cooking system connector 240, multiple cooking system connectors 240 (e.g., 2, 3, etc.), and/or any other suitable number of connectors. The cooking system connector 240 is preferably electrically conductive, but can alternatively be electrically insulative, and/or have any other suitable properties. The cooking system connector 240 can be: metal (e.g., aluminum, stainless steel, copper, etc.), ceramic, polymer (e.g., silicone rubber, plastic, etc.), glass, and/or any other suitable material. The cooking system connector 240 is preferably a female connector (e.g., be a port), but can additionally and/or alternatively be a male connector. The cooking system connector 240 preferably connects to (e.g., receives) a male connector (e.g., probe connector 130 of the temperature probe), but can additionally and/or alternatively connect to a female connector. The cooking system connector 240 can be: a plug or socket connector, a crimp on connector, a soldered connector, a binding post, a screw terminal, a ring and spade connector, a blade connector, twist-on wire connector, alligator clip, and/or any other suitable connector. The cooking system connector 240 is preferably an auxiliary jack, but can additionally and/or alternatively be a USB-A port, a USB-C port, a micro-USB port, a headphone jack, and/or any other suitable connector. For example, cooking system connector 240 is an auxiliary jack that connects to probe connector 130, which is an auxiliary plug.

The cooking system connector 240 preferably includes a set of contacts that electrically connect to the conductors of the probe connector 130. The cooking system connector 240 preferably includes a contact for each conductor, but can alternatively include one contact for multiple conductors or multiple contacts for a single conductor. Each contact is preferably spatially indexed, such that the processor can determine which connector conductor is providing the signal; however, the contacts can be otherwise identified. The cooking system connector 240 can include: a number of contacts that correspond to a maximum number of possible conductors on probe connector 130 (e.g., 3, 5, 6, 7, etc.), a set number of contacts, and/or any other number of contacts. The cooking system connector 240 preferably conducts electrical signals provided by the probe connector 130 to the processing system, but can otherwise handle the electrical signals. However, the cooking system connector 240 can be otherwise configured.

The processing system 250 functions to control the cooking system 200 and/or temperature probe 100 operation. The cooking system 200 can include: one processing system 250, multiple processing systems 250, and/or any other suitable number of processing systems. The processing system 250 can include: one or more processors, a memory, and/or any other suitable component.

The processing system 250 can be configured to: identify the temperature probe based on the detected ground-signal pattern, determine the temperature resolution model for the identified temperature probe, convert temperature probe signals into temperature measurements and/or estimates, track temperature measurements over a time period, optionally operate the cooking system 200 and/or another system based on the temperature measurements, and/or perform any other suitable functionality. The temperature estimates can be stored onboard (e.g., in the memory of the processing system 250), stored remotely, and/or otherwise stored. The temperature estimates can be stored for: a predetermined timeframe, indefinitely, a food instance, a cook session, and/or any other suitable period of time.

The processing system 250 can be configured to store and/or execute one or more sensor resolution models from a set of models, and/or the temperature probe 100 is configured to be used with a set of models. Each sensor resolution model is preferably specific to a temperature probe type (e.g., 1-sensor RTD, 2-sensor RTD, 1-sensor NTC, 2-sensor NTC, 3-sensor NTC, etc.), but can additionally and/or alternatively be specific to a temperature probe class (e.g., NTC, RTD, etc.), a temperature sensor class (e.g., RTD, NTC), shared between all temperature probe types, a specific temperature probe instance, a cooking system 200, and/or be otherwise specific or generic. Each model preferably converts an electrical signal (e.g., a resistance value, a voltage value, etc.) to a temperature estimate value, but can additionally and/or alternatively have any other suitable functionality. Each model can be: a machine learning model (ML model), a classical model, an equation, a lookup table, a graph, a database, a predetermined series of measurements, a predetermined series of analyses or transformations, a neural network, leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, and/or any other suitable model or methodology.

The models can be: generated onboard the cooking system, generated remotely (e.g., by the remote computing system 300), programmed into the processing system 250, updated via firmware updates (e.g., received from a remote computing system 300), and/or otherwise determined. The models can be determined (e.g., learned, trained, etc.) based on: data from the remote computing system 300, temperature estimates determined by the cooking accessory 200 and/or temperature probe 100, user-assigned labels, and/or any other suitable training data. The models can be automatically determined, manually determined, predetermined, or otherwise determined. The models can be executed onboard the processing system 250, remote from the cooking system 200 (e.g., by the remote computing system 300), and/or by any other suitable system. The model can be executed using: electrical signals (e.g., resistance values, voltage values, etc.) from the temperature probe 100, other measurements from the temperature probe 100, measurements from the cooking system 200, external data (e.g., from a database, from a user device, from a remote computing system 300, etc.), and/or any other suitable data. For example, the model can convert a resistance measurement to a temperature value. In an illustrative example, a first model (e.g., for a first temperature probe) converts a resistance signal value to a first temperature value, and a second model (e.g., for a second temperature probe) converts the same resistance signal value to a second temperature value different from the first. However, models can be otherwise configured.

The processing system 250 can additionally or alternatively store and/or generate a set of fusion models, which function to summarize the measurements from multiple sensors. The measurements are preferably concurrent or contemporaneous, but can alternatively be from multiple timeframes. The fusion model to use can be: manually selected, automatically selected (e.g., based on the sensor type, temperature probe type, cooking system, cooking instructions, etc.), and/or otherwise determined. Examples of fusion models that can be used include: taking the mean of the measurements, median of the measurements, minimum of the measurements, mode of the measurements, maximum of the measurements, most stable measurement, the measurement with the least deviation, and/or any other model.

In a first example, a first fusion model is used to process multiple measurements from a first temperature probe type, and a different fusion model is used to process multiple measurements from a different temperature probe type. In a second example, a first fusion model is used to process multiple measurements from a first sensor type, and a different fusion model is used to process multiple measurements from a different sensor type (e.g., all NTC sensors are averaged while all RTC measurements use floors). In a third example, the cooking instructions determine which fusion model to use, wherein the sensor resolution model is still selected based on the determined temperature probe type and/or sensor type. In a fourth example, a user selection determines which fusion model to use, wherein the sensor resolution model is still selected based on the determined temperature probe type and/or sensor type (e.g., whether to display a timeseries of spatial measurements according to the sensor's relative poses, or to fuse multiple readouts into a single value). However, the fusion models can be otherwise used.

The processing system 250 can be configured to: store and/or generate the one or more mappings between ground-signal conductor patterns and temperature probe types (e.g., identify a temperature probe based on the ground-signal conductor pattern); example shown in FIG. 7. The mappings are preferably programmed or loaded into the processing system 250 or memory, but can additionally and/or alternatively be generated onboard, generated remotely (e.g., by the remote computing system 300), updated via firmware updates, received from a remote computing system 300), and/or otherwise determined. The mappings are preferably stored in the processing system 250 (e.g., memory), but can additionally and/or alternatively be stored remotely (e.g., by the remote computing system 300, by an external database, etc.).

Figure 3:
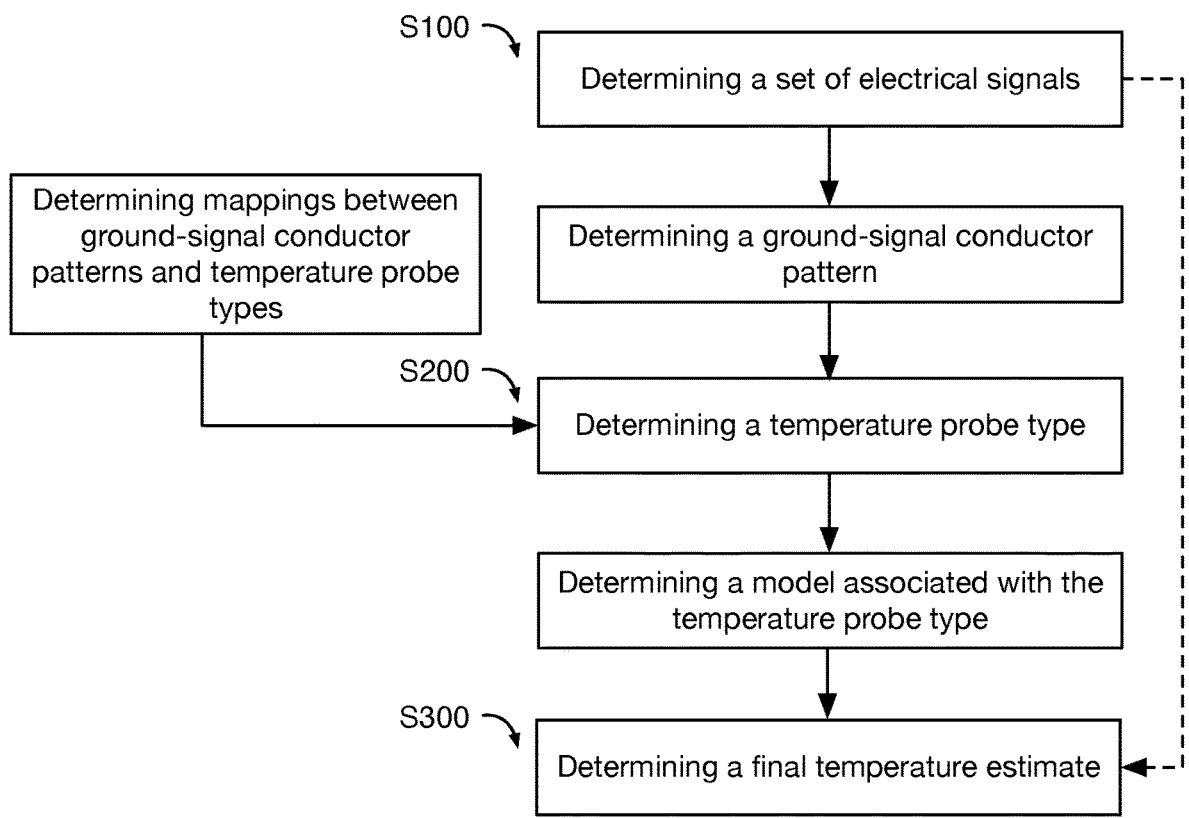
FIG. 3 is an illustrative example of a variant of the method.

The processing system 250 can be configured to: perform all or portions of the method (e.g., S100-S300). In variants, the processing system 250 can: receive a set of electrical signals from the temperature probe 100, determine a ground-signal conductor pattern from the set of electrical signals, retrieve mappings between ground-signal conductor patterns and temperature probe types, determine a temperature probe type based on the determined ground-signal conductor pattern and the mappings, determine a model (e.g., a lookup table) associated with the temperature probe type, and determine a final temperature estimate using the model based on the set of electrical signals; example shown in FIG. 3.

The processing system 250 can be configured to: generate and/or present notifications. The notifications can be presented on: the user interface 230 (e.g., a display), an external display (e.g., a browser, a user device display, etc.), a smart speaker, and/or any other suitable interface. The notifications can be: visual, audio, haptic (e.g., vibration), and/or in any other suitable format. The notifications can be generated based on: a temperature estimate, an expected temperature estimate and/or range, a target temperature estimate, a food identifier, a timer, a set of predetermined ground-signal conductor patterns, and/or otherwise determined. In a first example, a notification is generated when the temperature estimate is not within an expected temperature estimate range. In a second example, a notification is generated when a temperature probe type is not identified (e.g., when a ground-signal conductor pattern determined based on the set of electrical signals does not match any of the set of predetermined ground-signal conductor patterns). In a third example, a notification (e.g., with the identified temperature probe type) is generated when the temperature probe type is identified.

The processing system 250 can be configured to: store calibration information and/or calibrate the cooking system 200 and/or temperature probe 100. For example, the processing system 250 can store an electrical signal (e.g., measured signal) in association with a reference temperature. In a first specific example, a user is instructed to insert the temperature probe 100 into boiling water. The cooking system 200 (e.g., processing system 250) can record the electrical signal measured by the temperature probe 100, and store the electrical signal in association with 100° C. In a second specific example, a user is instructed to insert the temperature probe 100 into ice water. The cooking system 200 (e.g., processing system 250) can record the electrical signal measured by the temperature probe 100, and store the electrical signal in association with 0° C.

The processing system 250 can be configured to: control the cooking system 200 (e.g., based on a set of control instructions received from the remote computing system 300, based on the temperature estimates, etc.). For example, the processing system 250 can execute a program associated with a set of control instructions (e.g., user instructions, automatic cooking instructions for a food, etc.). The program can include: instructions to execute one or more models (e.g., a single model, a series of models, etc.), a predetermined analysis, a predetermined series of temperature estimates, a series of operation instructions (e.g., instructions to display a predetermined set of variables or visual assets, etc.), cooking element control instructions (e.g., to heat, steam, cool, and/or otherwise treat the food), and/or any other suitable program.

However, the processing system 250 can be otherwise configured.

However, the cooking system 200 can be otherwise configured.

Figure 5:
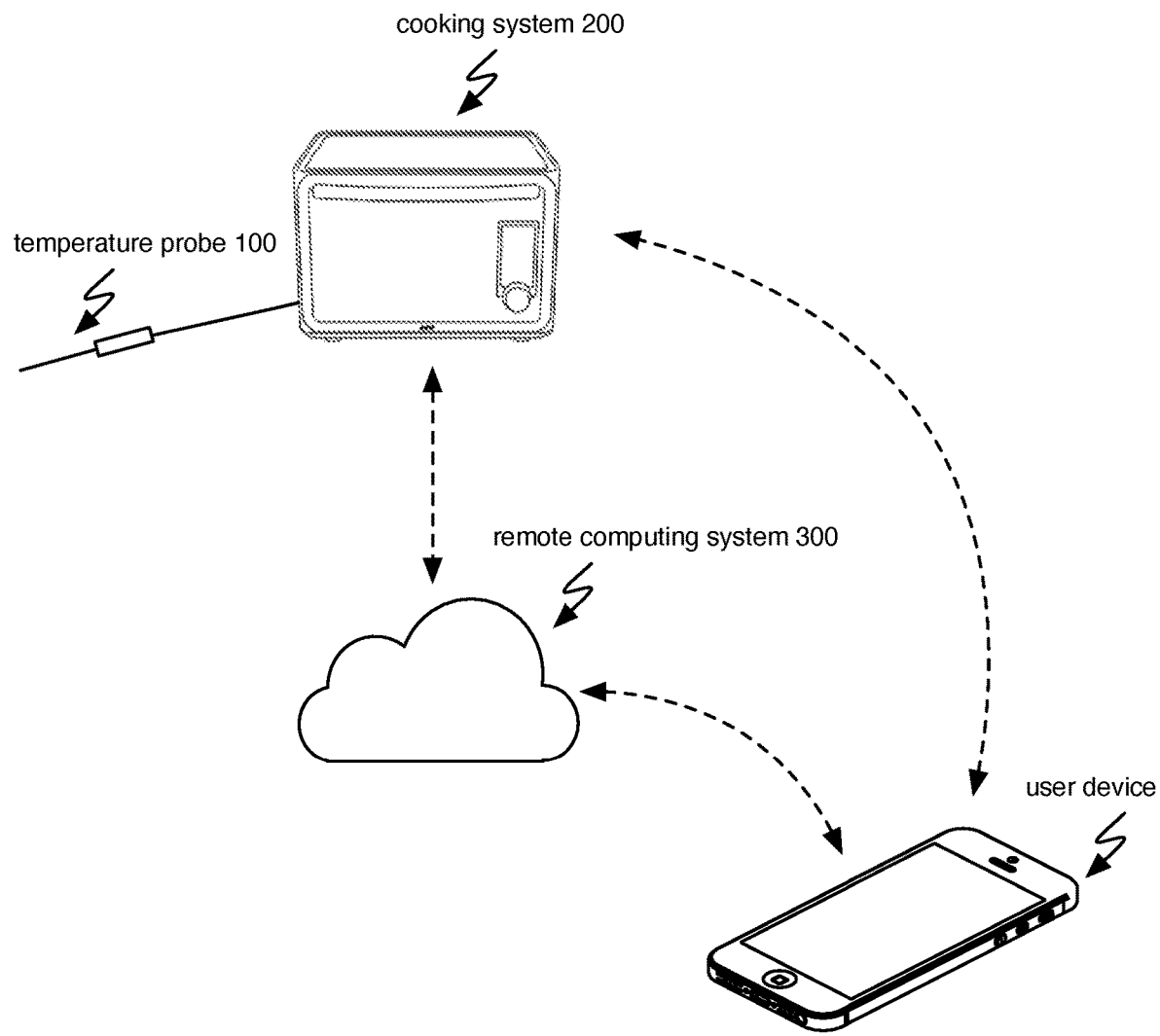
FIG. 5 is an illustrative example of wirelessly connecting the cooking system to a remote computing system and/or a user device.

The system can optionally include a remote computing system 300 (e.g., platform), which functions to generate models, store models, update the cooking system 200 with models, store temperature estimates, store user preferences, generate cooking instructions, and/or perform other functionalities. The remote computing system 300 can be accessible via an API, through a unique endpoint, through a unique uniform resource identifier (URI), and/or otherwise accessed. The cooking system 200 can connect to the remote computing system 300 via Wi-Fi, Bluetooth (e.g., using a user device such as a smartphone, tablet, laptop, and/or desktop), cellular, and/or any other suitable wireless communication, but can additionally and/or alternatively be accessible through a wired communication (e.g., Ethernet); example shown in FIG. 5. The remote computing system 300 can be: a cloud computing system, a distributed network, a server system, and/or any other suitable computing system. The remote computing system can include: a model training system, a model repository, data storage, a device database, and/or any other suitable component.

However, the remote computing system 300 can be otherwise configured.

4. METHOD

The method can include: determining a set of electrical signals S100, determining a temperature probe type S200, determining a final temperature estimate S300, and/or any other suitable elements.

All or portions of the method can be performed by a cooking system 200 (e.g., by the processing system 250), a temperature probe 100, a remote computing system 300, and/or any other suitable system. All or portions of the method can be performed in real-time, near-real time, and/or otherwise performed. The method can be performed after a predetermined event (e.g., temperature probe 100 actuated), after receiving user input (e.g., cooking instructions), periodically, randomly, and/or any other suitable time.

4.1. Determining a Set of Electrical Signals S100.

Determining a set of electrical signals S100 functions to determine one or more electrical signals from a temperature probe 100. S100 is preferably performed before S200, but can alternatively be performed concurrently with S200, after S200, and/or any other suitable time. S100 is preferably performed by a processing system 250 of a cooking system 200, but can additionally and/or alternatively be performed by a remote computing system 300, and/or any other suitable computing system.

The set of electrical signals are preferably received from a temperature probe 100, but can additionally and/or alternatively be received from an external system, and/or any other suitable system. The set of electrical signals can be received after a probe connector 130 of the temperature probe 100 connects to cooking system connector 240 of the cooking system 200, after the temperature probe 100 is inserted into or thermally contacts an object, and/or at any other time. Each electrical signal of the set is preferably received from a conductor (e.g., a tip, a sleeve, a ring) of the probe connector 130 (e.g., via a contact of the cooking system conductor 240), but can additionally and/or alternatively be received from a different component of the temperature probe 100, a component of the cooking system 200, and/or otherwise received. Electrical signals of the set are preferably concurrently and/or contemporaneously received, but can additionally and/or alternatively be serially received. The electrical signal is preferably associated with a resistance value, but can additionally and/or alternatively be associated with a voltage value, a current value, and/or any other suitable value.

However, the set of electrical signals can be otherwise determined.

4.2. Determining a Temperature Probe Type S200.

Determining a temperature probe type S200 functions to identify a temperature probe type for the temperature probe 100 connected to the cooking system 200. S200 is preferably performed after S100, but can alternatively be performed concurrently with S100, before S100, and/or any other suitable time. S200 is preferably performed by a processing system 250 of a cooking system 200, but can additionally and/or alternatively be performed by a remote computing system 300, and/or any other suitable computing system. In variants, S200 described herein can be equally applicable to temperature sensor types.

The temperature probe type is preferably determined based a set of electrical signals (e.g., determined in S100), but can additionally and/or alternatively be determined based on a temperature probe identifier, retrieved from a database, selected manually (e.g., on user interface 230 of cooking system 200), and/or otherwise determined.

In a first variant, the temperature probe type can be determined based on a ground-signal conductor pattern (e.g., spatial pattern) of the set of electrical signals. For example, unique ground-signal conductor patterns are preferably associated with different temperature probe types, but can additionally and/or alternatively not be associated with different temperature probe types. Each conductor (e.g., a tip, a ring, a sleeve, etc.) of the probe connector 130 can be associated with an electrical signal or is grounded.

In a first specific example, the temperature probe type is identified as a 1-sensor RTD when a tip of the probe connector 130 is grounded, an electrical signal is detected at a single ring of the probe connector 130, and a sleeve of the probe connector 130 is grounded, wherein the probe connector 130 only includes a tip, a single ring, and a sleeve.

In a second specific example, the temperature probe type is identified as a 2-sensor RTD when a tip of the probe connector 130 is grounded, an electrical signal is detected at a first ring of the probe connector 130, an electrical signal is detected at a second ring of the probe connector 130, and a sleeve of the probe connector 130 is grounded, wherein the probe connector 130 only includes a tip, a first ring, a second ring, and a sleeve.

In a third specific example, the temperature probe type is identified as a 1-sensor NTC when an electrical signal is detected at a tip of the probe connector 130, and a sleeve of the probe connector 130 is grounded, wherein the probe connector 130 only includes a tip and a sleeve.

In a fourth specific example, the temperature probe type is identified as a 2-sensor NTC when an electrical signal is detected at a tip of the probe connector 130, an electrical signal is detected at a single ring of the probe connector 130, and a sleeve of the probe connector 130 is grounded, wherein the probe connector 130 only includes a tip, a single ring, and a sleeve.

In a fifth specific example, the temperature probe type is identified as a 3-sensor NTC when an electrical signal is detected at a tip of the probe connector 130, an electrical signal is detected at a first ring of the probe connector 130, an electrical signal is detected at a second ring of the probe connector 130, and a sleeve of the probe connector 130 is grounded, wherein the probe connector 130 only includes a tip, a first ring, a second ring, and a sleeve.

In a second variant, the temperature probe type can be determined based on a temperature probe identifier encoded within an electrical signal of the set of electrical signals. The temperature probe identifier can be: unique to the temperature probe instance (e.g., globally unique), unique to the temperature probe class (e.g., all temperature probes of the same make and/or model share the same identifier), nonunique, and/or otherwise related to other temperature probes. The temperature probe identifier can be used as the temperature probe type and/or be converted (e.g., by the processing system 250) to the temperature probe type.

In a third variant, the temperature probe type can be selected by a user on a user interface 230 of a cooking system 200, wherein the cooking system 200 is connected to the temperature probe 100.

However, the temperature probe type can be otherwise determined. S200 can optionally include providing the temperature probe type to a user interface 230 of the cooking system 200. The user interface 230 is preferably a display as described above, but can additionally and/or alternatively be: a different display, a projector, a speaker, a printer, a plotter, a headphone, an external system, and/or any other suitable user output. For example, the temperature probe type is displayed on the display.

4.3. Determining a Final Temperature Estimate S300.

Determining a final temperature estimate S300 functions to determine a final temperature estimate for an object using the temperature probe 100. S300 is preferably performed after S200, but can alternatively be performed concurrently with S200, before S200, and/or any other suitable time. S300 is preferably performed by a processing system 250 of a cooking system 200, but can additionally and/or alternatively be performed by a remote computing system 300, and/or any other suitable computing system.

The final temperature estimate is preferably numerical, but can additionally and/or alternatively be categorical. The final temperature estimate is preferably continuous, but can additionally and/or alternatively be discrete. The final temperature estimate can be determined in Fahrenheit, Celsius, Kelvin, and/or any other suitable measurement unit. The final temperature estimate can be rounded to the nearest 0.001°, 0.01°, 0.1°, 1°, within any range bounded by any of the aforementioned values, and/or any other suitable rounding metric.

Figure 12:
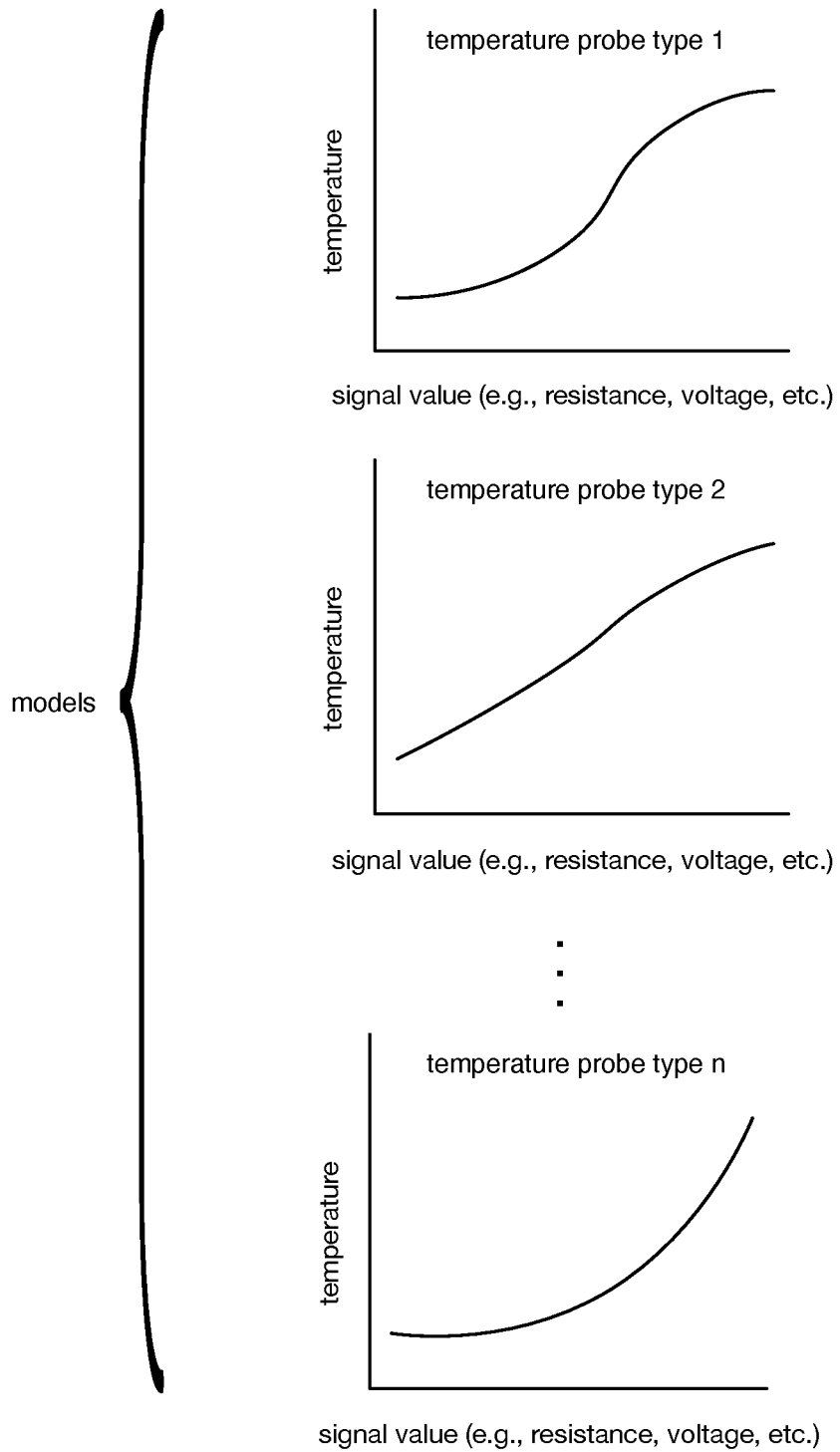
FIG. 12 is an illustrative example of a set of models associated with different temperature probe types.

The final temperature estimate can be determined based on: a temperature probe type (e.g., determined in S200), a sensor type (e.g., determined in S200), a set of electrical signals received from the temperature probe (e.g., determined in S100; e.g., using a different instance of the electrical signal set; etc.), a cooking system 200, and/or otherwise determined. The final temperature estimate is preferably determined using one or more sensor resolution models, but can additionally and/or alternatively be retrieved from a database, determined manually, and/or otherwise determined. The sensor resolution model is preferably determined (e.g., selected, retrieved, etc.) based on the temperature probe type (and/or sensor type) determined in S200, or be otherwise identified. The sensor resolution model is preferably retrieved from the processing system 250 (e.g., memory) of the cooking system, but can additionally and/or alternatively be retrieved from the remote computing system 300, an external database, and/or otherwise determined. The model is preferably a lookup table (example shown in FIG. 8), but can additionally and/or alternatively be an equation, a regression model, a curve, any model as described above, and/or any other suitable model or methodology; example shown in FIG. 12.

In variants, determining a final temperature estimate can include using a model associated with the temperature probe type. In examples, S300 can include determining a lookup table specific to the identified temperature probe type in S200, and retrieving a set of temperature estimates using the lookup table that corresponds to the set of electrical signals (e.g., resistance values, voltage values, etc.) determined in S100. The temperature probe 100 can include a single sensor 120 or multiple sensors 120.

In a first specific example, the temperature probe 100 includes a single sensor 120. S300 includes retrieving a single temperature estimate that corresponds to a single electrical signal (e.g., resistance value) from the lookup table, wherein the single temperature estimate is used as the final temperature estimate.

In a second specific example, the temperature probe 100 includes multiple sensors 120, wherein the multiple sensors 120 are the same, but located in different positions along the probe body 110. In this example, S300 can include: optionally determining a fusion model (e.g., based on the identified temperature probe type, sensor type, a cooking instruction, a user selection, etc.); retrieving multiple temperature estimates, each corresponding to multiple electrical signals (e.g., resistance values) from the lookup table; and determining a final temperature summary based on the multiple temperature estimates and optionally the fusion model.

However, the final temperature estimate can be otherwise determined.

S300 can optionally include providing the final temperature estimate to a user interface 230 of the cooking system 200. The user interface 230 is preferably a display as described above, but can additionally and/or alternatively be: a different display, a projector, a speaker, a printer, a plotter, a headphone, an external system, and/or any other suitable user output. For example, the final temperature estimate is displayed on the display.

5. EXAMPLES

Figure 9:
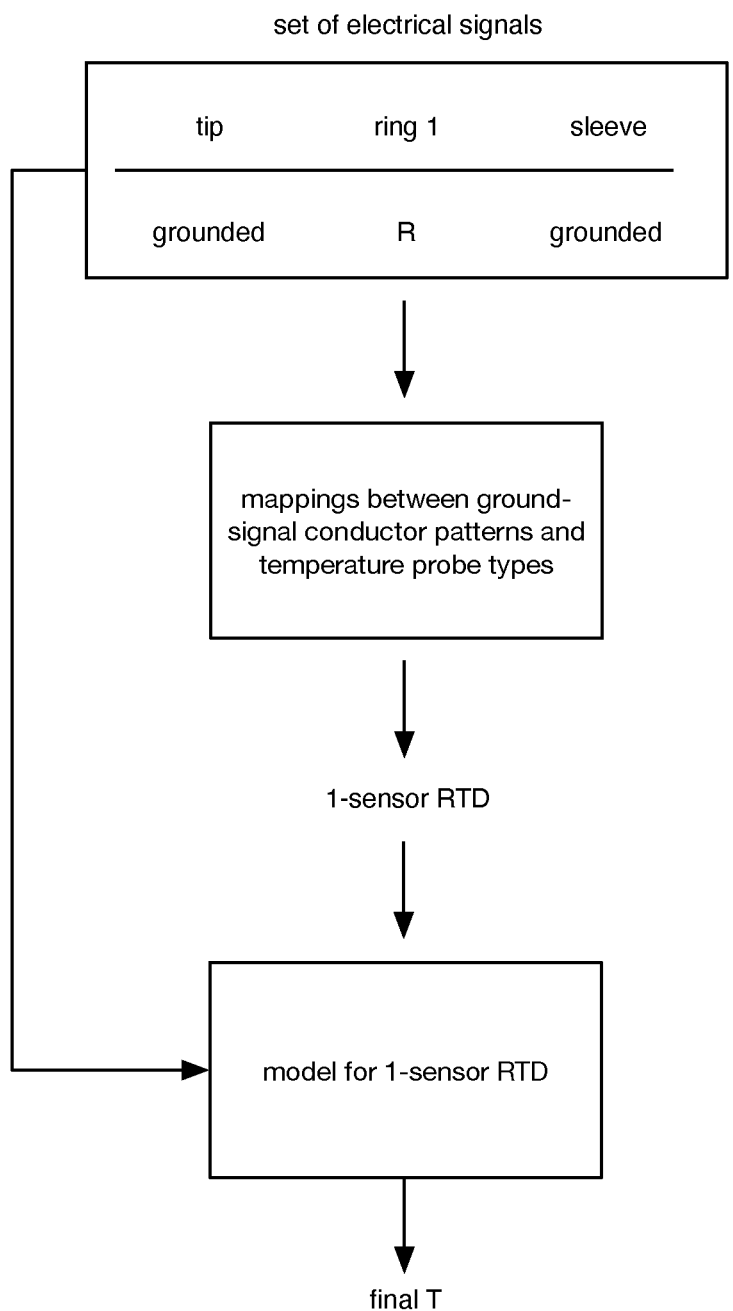
FIG. 9 is an illustrative example of a variant of the method.

In an example, the method can include: receiving a set of electrical signals from the temperature probe 100, determining a ground-signal conductor pattern from the set of electrical signals, retrieving mappings between ground-signal conductor patterns and temperature probe types, determining a temperature probe type based on the determined ground-signal conductor pattern and the mappings, determining a sensor resolution model (e.g., a lookup table) associated with the temperature probe type, optionally determining a fusion model, and determining a final temperature estimate using the sensor resolution model and optionally the fusion model, based on the set of electrical signals; example shown in FIG. 9. The temperature probe 100 can include: a probe body 110, a set of sensors 120 (e.g., NTC, RTD, etc.), and a male probe connector 130. The male probe connector 130 includes a set of conductors, wherein each conductor can be: a tip, a sleeve, or a ring.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
   receiving a set of electrical signals from a temperature probe, wherein the temperature probe comprises a connector comprising a set of conductors, wherein the set of conductors comprises a tip, a set of rings, and a sleeve, wherein each electrical signal of the set of electrical signals is received from a different conductor of the set of conductors;
   determining a ground-signal conductor pattern based on the set of electrical signals;
   determining a temperature probe type for the temperature probe based on the ground-signal conductor pattern, wherein the temperature probe type is determined to be a resistance temperature detector (RTD) sensor when the tip is grounded;
   determining a temperature model associated with the temperature probe type; and
   determining a temperature estimate based on the set of electrical signals, using the temperature model.

2. The method of claim 1, wherein:
   the temperature probe type is determined to be a 1-sensor RTD when a single signal is received from the set of rings; and
   the temperature probe type is determined to be a 2-sensor RTD when two signals are received from the set of rings.

3. The method of claim 1, wherein the temperature model comprises a lookup table, wherein determining the temperature estimate comprises:
   retrieving, from the lookup table, a set of temperature estimates associated with the set of electrical signals; and
   determining the temperature estimate based on the set of temperature estimates.

4. The method of claim 3, wherein the temperature estimate is a lowest temperature estimate within the set of temperature estimates.

5. The method of claim 1, wherein the temperature probe type is automatically determined without user selection.

6. The method of claim 1, wherein the temperature probe type is at least one of a resistance temperature detector (RTD), a negative temperature coefficient thermistor (NTC), or a thermocouple (TC).

7. The method of claim 1, wherein the method is performed by a cooking system comprising at least one of an oven, a grill, a pot, or a wireless hub.

8. A system, comprising:
   a set of temperature probes, wherein each temperature probe comprises a set of sensors and a probe connector, wherein each probe connector comprises a set of conductors, wherein each set of conductors comprises a tip and a sleeve;
   a cooking system, comprising:
     a set of cooking system connectors;
     a processor coupled to the set of cooking system connectors, configured to:
       receive a set of electrical signals from a temperature probe of the set of temperature probes, wherein each electrical signal of the set of electrical signals is received from a different conductor of the set of conductors;
       determine a ground-signal conductor pattern based on the set of electrical signals;
       determine a temperature probe type for the temperature probe based on the ground-signal conductor pattern, wherein the temperature probe type is determined to be a negative temperature coefficient thermistor (NTC) when an electrical signal is received from the tip;
       determine a temperature model associated with the temperature probe type; and
       determine a temperature estimate based on the set of electrical signals using the temperature model.

9. The system of claim 8, wherein the temperature model comprises a lookup table.

10. The system of claim 8, wherein determining the temperature estimate comprises:
    determining a plurality of temperature estimates based on the set of electrical signals, using the temperature model; and
    determining the temperature estimate based on the plurality of temperature estimates.

11. The system of claim 8, wherein the set of conductors further comprises a ring, wherein the temperature probe type is determined to be an NTC with two sensors when electrical signals are received from the tip and the ring.

12. The system of claim 8, wherein the set of conductors comprises two rings, wherein the temperature probe type is determined to be an NTC with three sensors when electrical signals are received from the tip and the two rings.

13. The system of claim 8, wherein the cooking system comprises at least one of an oven, a grill, a pot, or a wireless hub.

14. The system of claim 8, wherein a sensor of the set of sensors comprises at least one of a resistance temperature detector (RTD), a negative temperature coefficient thermistor (NTC), or a thermocouple (TC).

15. A system, comprising:
    a temperature probe comprising a set of sensors; and
    a probe connector comprising a set of conductors connected to the set of sensors, wherein the probe connector is configured to output sensor signals according to a spatial pattern specific to a temperature probe type for the temperature probe, wherein the spatial pattern is used to identify the temperature probe type and determine a temperature resolution model for interpreting the sensor signals, based on the temperature probe type, wherein the temperature probe is identified as resistance temperature detector (RTD) when a tip of the probe connector is grounded; and the temperature probe is identified as a negative temperature coefficient thermistor (NTC) when a sensor signal is detected at the tip.

16. The system of claim 15, wherein the temperature probe type is automatically determined by a cooking system, connected to the probe connector, without user selection.

17. The system of claim 15, wherein the set of conductors outputs a different sensor signal for each sensor within the set of sensors.

18. The system of claim 15, wherein the temperature resolution model comprises a lookup table.

19. The system of claim 15, wherein the system comprises at least one of an oven, a grill, a pot, or a wireless hub.

* * * * *